US012638410B2

(12) United States Patent
Maillard

(10) Patent No.: US 12,638,410 B2
(45) Date of Patent: May 26, 2026

(54) METHOD FOR INDICATING THE CONCENTRATION LEVEL OF AN IRRIGATION SOLUTION IN THE APICAL ZONE OF A DENTAL ROOT CANAL

(71) Applicant: Thierry Maillard, Le Haillan (FR)

(72) Inventor: Thierry Maillard, Le Haillan (FR)

( * ) Notice: Subject to any disclaimer, the term of this patent is extended or adjusted under 35 U.S.C. 154(b) by 207 days.

(21) Appl. No.: 18/478,548

(22) Filed: Sep. 29, 2023

(65) Prior Publication Data

US 2024/0053289 A1    Feb. 15, 2024

Related U.S. Application Data

(63) Continuation-in-part of application No. 17/354,778, filed on Jun. 22, 2021, now abandoned.

(30) Foreign Application Priority Data

Jun. 22, 2020    (FR) ..................................... 20 06486

(51) Int. Cl.
| | |
|---|---|
| *G01N 27/22* | (2006.01) |
| *A61C 5/40* | (2017.01) |
| *A61C 5/50* | (2017.01) |
| *A61C 19/04* | (2006.01) |

(52) U.S. Cl.
CPC ............... *G01N 27/22* (2013.01); *A61C 5/50* (2017.02); *A61C 19/04* (2013.01); *A61C 19/042* (2013.01); *A61C 5/40* (2017.02)

(58) Field of Classification Search
CPC ......... A61C 19/042; A61C 19/04; A61C 5/50; A61C 5/40; A61C 5/44; G01N 27/22; G01N 27/02; A61K 6/52; A61K 6/56
See application file for complete search history.

(56) References Cited

U.S. PATENT DOCUMENTS

| | | | |
|---|---|---|---|
| 2004/0225234 A1* | 11/2004 | Siemons | A61B 5/0534 600/590 |
| 2011/0039227 A1* | 2/2011 | Aeby | A61C 19/042 433/32 |
| 2013/0040267 A1* | 2/2013 | Bergheim | A61C 17/20 433/226 |
| 2017/0340413 A1* | 11/2017 | Burns | A61C 5/40 |

* cited by examiner

*Primary Examiner* — Amy He
(74) *Attorney, Agent, or Firm* — Perman & Green, LLP

(57) ABSTRACT

Method for electronically indicating a concentration of an irrigation solution in a root canal (RC) of a tooth (T), using a device able to be electrically connected to an endodontic instrument engaged in the canal and to a labial electrode, and including a screen to display the progression of the instrument in said canal relatively to a critical apical point of reference such as the cemento-dentinal junction (CDJ), said device being furthermore able to measure, in the vicinity of said point of reference, by conductimetry, a concentration of an electrolyte irrigation solution injected into the root canal.

8 Claims, 3 Drawing Sheets

METHOD FOR INDICATING THE CONCENTRATION LEVEL OF AN IRRIGATION SOLUTION IN THE APICAL ZONE OF A DENTAL ROOT CANAL

CROSS-REFERENCE TO RELATED APPLICATIONS

This application is a continuation-in-part of Ser. No. 17/354,778, filed Jun. 22, 2021, the disclosure of which is incorporated herein by reference in its entirety.

BACKGROUND

1. Field

The present invention belongs to the general field of endodontics, in particular devices for locating an apex, commonly called (electronic) apex locators, making it possible to measure the concentration of the irrigation solution in the root canal before the cemento-dentinal junction.

2. Brief Description of Related Developments

It is suitable beforehand to briefly recall the anatomy of a dental root at the apical zone. The canal system and more particularly the apical structure can for example be described according to Kuttler's apical concept which gives a rather representative model of it diagramed in FIG. 1.

FIG. 1 shows, as a partial longitudinal cross-section, a dental root DR passed through at its center by a root canal RC which terminates with an orifice AF, called apical foramen, at the end of said root for the passage of blood vessels and nerve fascicles. The apical foramen AF generally has a bottleneck shape due to a shrinking then an enlarging of the root canal RC which define a zone of minimum diameter called apical constriction AC. The apical constriction AC constitutes the narrowest passage of the neurovascular bundle irrigating the pulp. Generally, the root canal RC has a converging then diverging shape between the coronary part and the periapex, which amounts to two cones opposed by their vertices at the apical constriction AC. More precisely, the root canal RC defines a dentinal cone and a shorter cemental cone, the interface between the two is called cemento-dentinal junction CDJ. As shown in the detail A of FIG. 1, the apical constriction AC and the cemento-dentinal junction CDJ are not necessarily confounded, but it happens that they are. Specialized literature shows that the AC regularly coincides with the CDJ or is in the vicinity of the latter.

During an endodontic treatment, the practitioner (dental surgeon) seeks to remove all the materials, debris and organic fluids that fill up the root canal to the bottom, i.e. to the apical foramen, in order to prevent a dental abscess from appearing again in said canal. However, their objective is especially, as much as possible, to not go beyond the apical terminus APX, or apex, on the one hand, to not cause pain to the patient, and on the other hand, to not dig a cavity under the root, beyond the apex, which could give rise to the appearance of an abscess.

It is therefore primordial for the practitioner to very precisely locate the apical foramen and the apex, in particular during operations of cleaning and shaping the root canal (canal preparation), in order to prevent crossing the apical foramen. This reverts to determining "the working length" which designates the exact length between a coronary point of reference and an apical limit fixed and chosen beforehand, conventionally located at the apical constriction. This working length can be determined using a radiography (which gives the less precise radiographic apex RA) and/or an electronic apex locator (which gives the more precise anatomical apex AA).

The irrigation is a key step in canal preparation.

The objective of the irrigation is the removal of various microorganisms, lubrification of the endodontic instruments inserted into the canal and dissolution of the organic debris and minerals. It consists of abundantly injecting into the canal an irrigation solution such as sodium hypochlorite (NaOCl).

Sodium hypochlorite has an antimicrobial action and dissolution of tissues of which the effectiveness increases with the concentration, but has a risk of toxicity, in particular of cytotoxicity, at high concentrations.

"Medical" concentrations of NaOCl ranging from 0.5% to 5.25% are widely used in clinical practice. Although less concentrated solutions have shown a certain antimicrobial effectiveness, the aforementioned concentrations have a faster and more substantial bactericidal effect, but in general must not be exceeded.

At an excessively high concentration, sodium hypochlorite has an extremely toxic effect on vital tissues, it is a corrosive liquid. Propelled in a substantial quantity into the periapex, it can cause effects such as hemolysis, an ulceration of the skin, necrosis, even a weakening of the facial nerves of the region concerned. In addition, sodium hypochlorite has an effect on the dentinal hardness. Prolonged exposure at a high concentration can decrease the elasticity modulus (in flexure) of the dentin.

It is therefore capital to know with precision the concentration of the irrigation solution, here NaOCl, in the canal, especially in the apical zone, to ensure effective treatment and limit any risk of toxicity.

No apex locator or similar, as far as the applicant knows, makes it possible to determine this concentration in the apical zone, in particular at the cemento-dentinal junction.

The present invention aims to respond to the needs of practitioners to know in a practical and reliable manner the concentration of the irrigation solution in the root canal during an endodontic treatment.

To that end, the object of the present invention is a method for electronically indicating a concentration of an irrigation solution in a root canal of a tooth, using a device able to be electrically connected to an endodontic instrument engaged in the canal and to a labial electrode, and including a screen to display a progression of the instrument in said canal relatively to a critical apical point of reference such as the cemento-dentinal junction. This method is remarkable in that said device is furthermore able to measure, in the vicinity of said point of reference, by conductimetry, a concentration of an electrolyte irrigation solution injected into the root canal, and in that the measured concentration is memorized in the device even if the endodontic instrument is removed from the root canal.

Memorization of the concentration level even when the endodontic instrument is removed from the canal provides real diagnostic comfort until the instrument is re-inserted into the canal or switched off.

The device used can be coupled with an apex locator to improve ergonomics by having both irrigation solution concentration and apex location informations at the same time.

Once mechanical cleaning has been completed by the practitioner, the next step is cleaning and disinfecting by injection of a NaCl solution.

According to a particularly advantageous aspect of the invention, any measurement of the concentration of the irrigation solution is taken in an area of about one millimeter before the cemento-dentinal junction in the direction of engagement of the endodontic instrument in the root canal.

According to an embodiment, a measured level of concentration, relatively to a range of medical concentrations, is displayed on the screen of the device via a visual indicator.

For example, the visual indicator is a bar graph.

Furthermore, the device includes connection cords via which it can be electrically connected to the endodontic instrument, to the labial electrode and the like.

Advantageously, processing and calculation means of the device, via two or more frequencies, are adapted for a conductimetric calculation at least for one irrigation solution of sodium hypochlorite NaOCl, and make it possible to display a measured level of concentration on a scale that comprises at least one value substantially equal to: 0.5%, 2.5% or 5.25%, with these concentrations being the most recommended and used in endodontics, in particular during canal preparations.

According to an embodiment, the screen displays validation information of the "OK" type as long as the measured concentration of the irrigation solution is substantially equal to an injection concentration of said solution.

The object of the invention is also a device for measuring the concentration of an irrigation solution in a root canal of a tooth implementing a method such as shown.

Advantageously, the device comprises means of memorizing concentration information in order to facilitate the work of the practitioner because they can read the value of the concentration of the irrigation solution even when the instrument is out of the canal of the patient.

As the fundamental concepts of the invention have just been disclosed in their most elementary form, other details and characteristics shall appear more clearly when reading the following description and with respect to the accompanying drawings, giving by way of a non-limiting example an embodiment of a device in accordance with the principles of the invention.

BRIEF DESCRIPTION OF THE DRAWINGS

The foregoing aspects and other features of the present disclosure are explained in the following description, taken in connection with the accompanying drawings, wherein.

DETAILED DESCRIPTION

It is suitable to note that certain devices and methods well known to those skilled in the art are here described to prevent any insufficiency or ambiguity in the comprehension of the present invention.

In the embodiment described hereinafter, reference is made to an improved device to measure the concentration of the irrigation solution in the root canal of a tooth, mainly intended for measuring said concentration in the immediate vicinity of the cemento-dentinal junction during a canal preparation. This example, which is not limiting, is given for better comprehension of the invention and does not exclude another use of the device. For example, the device can be adapted to measure the concentration of an irrigation solution or of a physiological liquid in another anatomical region of which the treatment is similar to the endodontic treatment, at least regarding the injection of an ionic solution into a canal terminating with a tip (apex).

Figure 1:
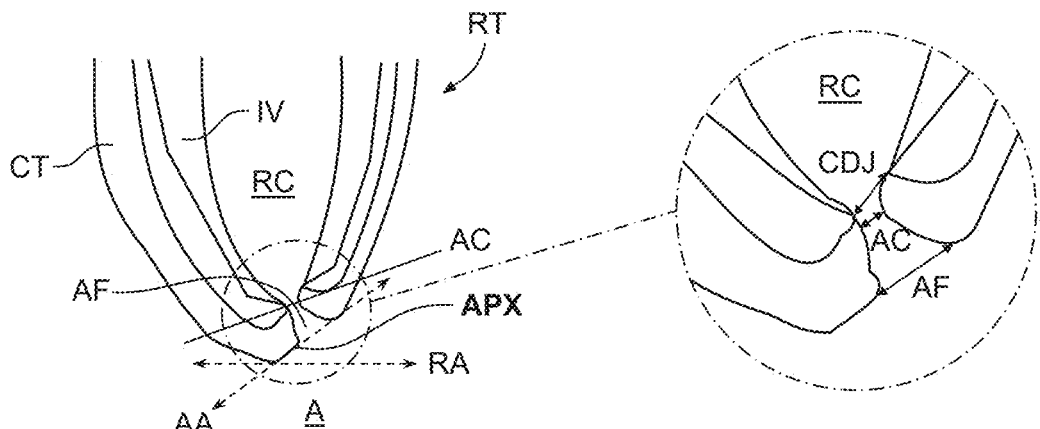
FIG. 1 is a longitudinal cross-section of a dental root at the apical zone according to Kuttler's apical concept.

In the rest of the description, the cemento-dentinal junction is designated by its acronym CDJ; the term "irrigant" designates an irrigation solution. Any reference to an anatomical part of the dental root at the apical zone will be done in reference to FIG. 1 already described.

Figure 2:
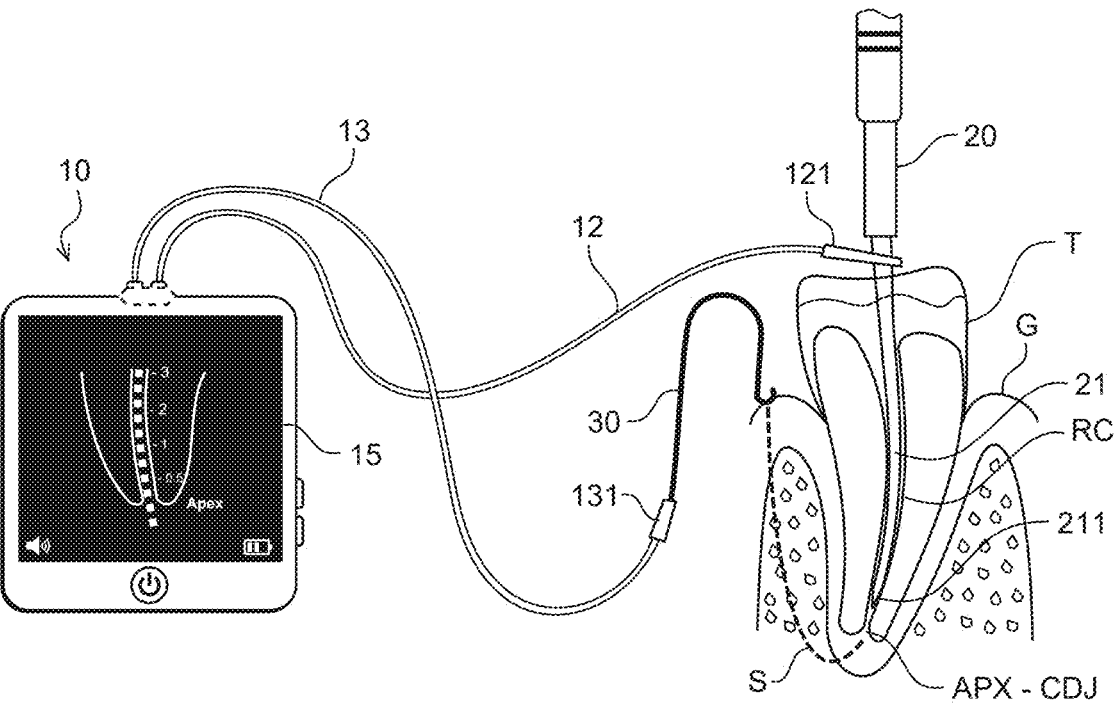
FIG. 2 is an example of using a device according to the invention on a tooth to measure the concentration of the irrigation solution.

FIG. 2 shows a device for calculating the concentration level 10 (hereinafter "NaCl calculator") conventionally connected on a tooth T specimen, or on a dental canal model, via an endodontic instrument 20, such as a file, and a labial hook 30, both having electrically conductive parts connected to the NaCl calculator by connection cords 12 and 13 in such a way as to form two measuring electrodes.

According to a known principle, the NaCl calculator 10 makes it possible to determine the NaCl concentration in the root canal RC of the tooth T using as a basis an indirect measurement of the resistance, or more generally of the impedance, by application of Ohm's Law between the terminals defined by the two electrodes.

As a general rule, the NaCl concentration calculators make use of the observation according to which the root canal has a fixed electrical impedance at the apical constriction, and operate with an alternating electric current in a closed circuit thanks to two electrodes delimiting a conductive anatomical unit between the canal and the lip of the patient. As the electrical voltage is known, imposed by the generator of the apex locator, the latter calculates the intensity of the current flowing, the latter varies according to the impedance of the anatomical unit. Thus, during the crossing of the apical zone by the instrument used, the value of the impedance changes abruptly to reach a value that is substantially constant from one individual to another, and the locator detects the intensity of the corresponding current.

The NaCl calculator 10 according to the present invention makes use of this principle and the link between electrical impedance and conductance to determine the concentration of an irrigation solution in the canal by conductimetry, as explained hereinafter.

The connection cords 12 and 13 of the NaCl calculator 10 are provided at their free end with a clamp 121 or any other means of connection 131 to be attached to the electrically conductive parts of the endodontic instrument 20 and of the labial hook 30.

The endodontic instrument 20, according to the example shown, is a canal preparation file including a metal rod 21 ending with a tip 211. Such a file is more preferably flexible in order to adapt to root canals with different curvatures. The clamp 121 of the connection cord 12 is fixed on the metal rod 21 of the file 20.

The labial hook 30 is however shaped to ensure a contact with the lip of the patient and/or their gingiva G.

Therefore, the endodontic instrument 20 and the labial hook 30 electrically delimit an anatomical unit passed through by the electric current flowing, shown as a broken line S in FIG. 2.

According to a fundamental aspect of the present invention, the NaCl calculator 10, thanks to this conventional mounting, makes it possible to measure the concentration of the irrigation solution in the canal RC, at the tip 211 of the instrument 20, via a conductimetry technique.

Indeed, the irrigation solution is an electrolyte solution wherein bathe charge carriers (ions) in aqueous form produced by the chemical reaction of the irrigation solution in the canal medium.

The case of sodium hypochlorite NaOCl is considered here which currently remains the most commonly used irrigant, even inevitable, in endodontics.

The antiseptic and dissolving effect of NaOCl is obtained by the following successive reactions:

$$NaOCl+H_2O \leftrightarrow NaOH+HOCl \leftrightarrow Na^+ + OH^- + H^+ + OCl^-$$

The first is a dissolution reaction of the sodium hypochlorite which produces hypochlorous acid HOCl. The latter, in a basic medium, is dissociated during the second reaction and produces hypochlorite ions $OCl^-$ known for their antibacterial effect. Indeed, the hypochlorite ion is a strong oxidant that inhibits bacterial enzymes and leads to an irreversible oxidation of the sulfhydryl groups (SH) which form most of the so-called enzyme membranes, thus causing the destruction thereof.

Of course, the ions formed after the second reaction hereinabove are aqueous.

Due to the presence of electrically-charged chemical species, the conductivity σ of the irrigation solution, in the case of NaOCl, is written:

$$\sigma = \lambda_{Na^+}[Na^+] + \lambda_{OH^-}[OH^-] + \lambda_{H^+}[H^+] + \lambda_{OCl^-}[OCl^-]$$

With $\lambda_X$ the ionic molar conductivity of the ion X, and [X] the concentration thereof in the solution.

By noting as C the concentration of the solution in chemical equilibrium, and in light of the charge coefficients of the ions at play, it is possible to write:

$$\sigma = C \Sigma_i \lambda_i$$

However, it is known that the conductivity is proportional to the conductance G which is none other than the inverse of the resistance R according to the formulas:

$$\sigma = kG; \quad G = \frac{1}{R}$$

The coefficient k depends on the geometry of the measuring cell.

By noting as Λ the sum of the ionic molar conductivities, it can be established that:

$$C = \frac{\sigma}{\Lambda} = \frac{k}{\Lambda R} = \frac{k'}{R}$$

The concentration C is therefore inversely proportional to the resistance R, the proportionality coefficient k' is a constant that essentially depends on the nature of the ions in the irrigation solution and on the geometry of the measuring cell.

The simplified formulation hereinabove is given to show the link between the resistance (or the impedance) of the anatomical unit passed through by the electric current and the concentration of the irrigation solution, a link that makes it possible to use the basic principle of the apex locator to determine said concentration by conductimetry.

6

Figure 3:
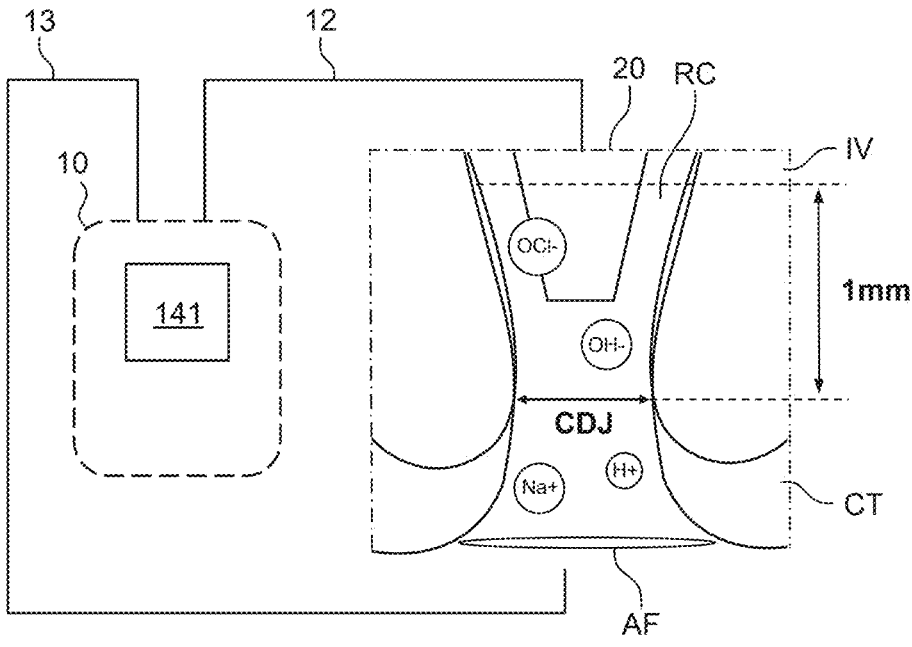
FIG. 3 shows the principle of conductimetric measurement of the concentration of the irrigation solution in the vicinity of the cemento-dentinal junction (with, for example, three frequencies 8.3 kHz-620 Hz-100 Hz)

FIG. 3 diagrammatical shows the measurement principle of the concentration of the irrigant in the apical zone of a dental root of which the anatomical structure has been simplified for better comprehension.

During the irrigation, the NaOCl solution fills the root canal RC up to the apical foramen AF and penetrates even into the least crevices of the canal thanks to its low surface tension.

The objective of the present invention is to allow the practitioner to know the concentration of the irrigant in the vicinity of the CDJ, for example in the last millimeter before the CDJ.

As a general rule, canal cleanings are carried out with concentrations of NaOCl between 0.5%, 2.5% and 5.25%. Consequently, the NaCl calculator 10 can be calibrated to indicate the level of concentration measured in this range of so-called "medical" concentrations.

Among its means of calculating and processing, the NaCl calculator 10 includes a specific electronic module 141 to manage the conductimetric calculations independently of the function of an apex locator. Such a module could be in the form of an electronic board that can be easily integrated into known models of apex locators.

As long as the operation of the electronic apex locators is based on the variation of an electric current according to the specific impedance of the canal, and the latter depends directly on the concentration of a possible electrolyte filling the canal, such as the irrigant, the present invention is adapted to the different generations and technologies of apex locators.

Figure 4:
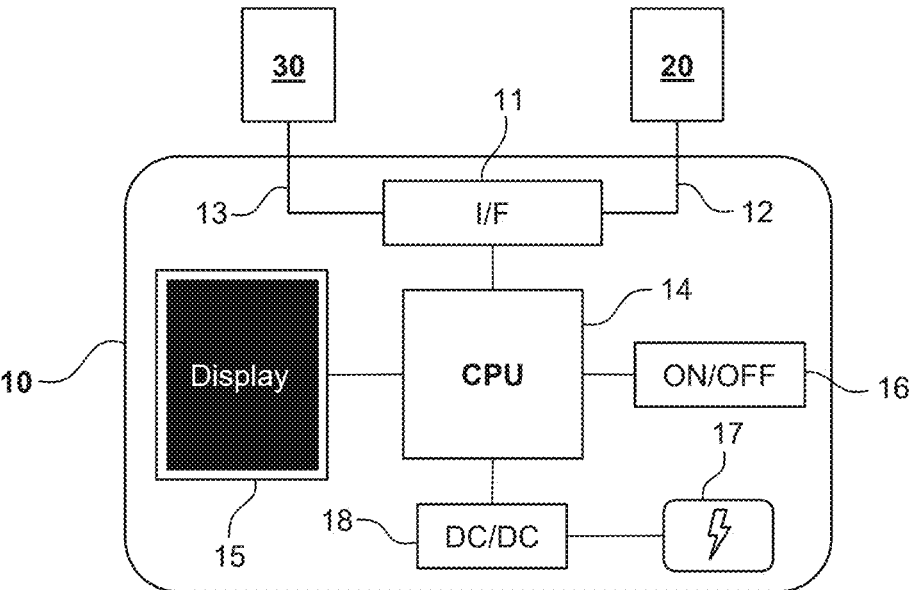
FIG. 4 is a simplified electrical assembly that makes it possible to measure the concentration by conductimetry according to the invention.

In particular and according to the embodiment of FIG. 4, the NaCl calculator 10 includes a connection interface 11 with the electrodes 20 and 30 through the connection cords 12 and 13, a calculation unit 14 of the microprocessor type connected to the different services in particular the display module 15, an on/off button 16, an electrical power supply battery 17 as well as an alternating current regulator 18.

The microprocessor 14 uses conductimetric calculations to measure the concentration of the irrigation solution and could also act as an apex locator. Of course, the apex locator has memory means required for storing the information generated.

It is important to recall that the quality of a canal cleaning mainly depends on the concentration of the irrigant (in the aforementioned medical range) and on the time the irrigant is present in the canal. Thus, the practitioner needs to monitor the concentration of the irrigant in the canal when they carry out a canal cleaning via irrigation. All the more so as knowledge of this concentration in the vicinity of the CDJ is crucial for ensuring the effectiveness of the treatment in this zone prone to complications and the appearance of abscesses.

Therefore, the NaCl calculator 10 according to the present invention allows for fast and intuitive access to the information on the concentration of the irrigant in the apical zone of the canal.

Figures 5A, 5B:
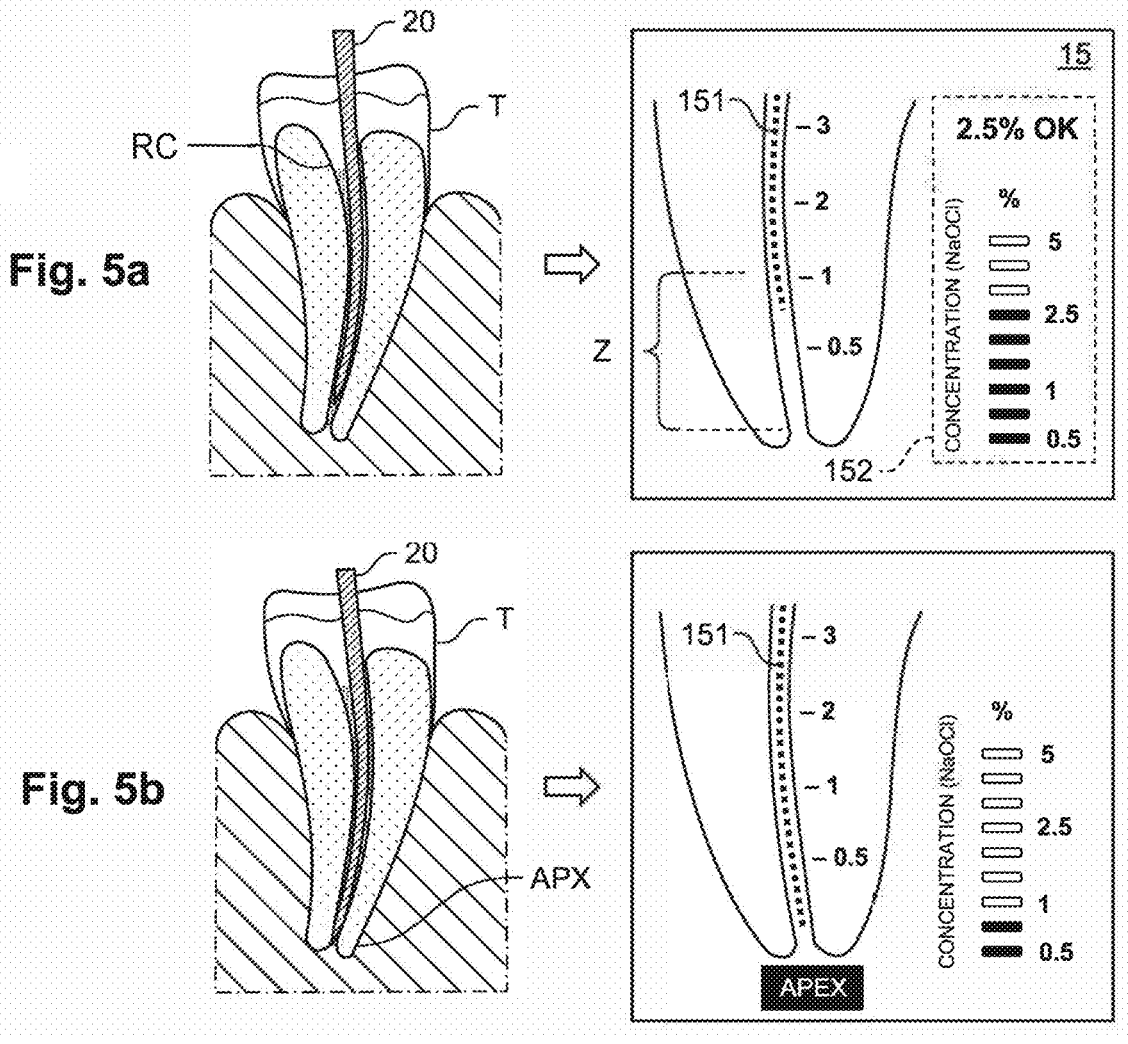
FIG. 5A is the graphical interface when the instrument crosses the last millimeter before the cemento-dentinal junction.
FIG. 5B shows the graphical interface when the instrument is at the apex.

FIGS. 5*a* and 5*b* give a possible display example (graphical interface) as the endodontic instrument 20 progresses in the canal RC of the tooth T. This display makes it possible to visualize, roughly, a partial longitudinal section of the dental root, at the apical zone Z, whereon a progression line 151 as a broken line indicates the progression of the instrument 20 inside the root canal RC. According to the example shown, the apical zone displayed corresponds approximately to the last three millimeters of the root, more precisely to the last three millimeters before the CDJ. The scale factor used is preferably dilated over the millimeter for better monitoring in this critical zone of the endodontic treatment.

In FIG. 5a, the instrument 20 begins to engage in the apical zone Z of the root canal RC.

In the example of FIGS. 5a to 5b, an injection of a solution of sodium hypochlorite NaOCl at a concentration of 2.5% is considered.

FIG. 5b shows that the instrument 20 has crossed the apical zone considered in such a way that the display obtained indicates the presence of the progression line 151 in the concentration measurement zone. The level of concentration measured is therefore indicated on the screen of the apex locator via a visual indicator such as a bar graph 152. For example, the display of the level of concentration can appear automatically and abruptly on the screen as soon as the instrument enters into measurement zone, in order to visually alert the practitioner. In the example shown, the screen indicates a level of concentration of 2.5%, in accordance with the injection concentration. A monitoring message such as "OK" can also be displayed when the concentration is at the level required so that the practitioner user is not disturbed by a complicated reading of the information. Thus, the practitioner monopolizes a major portion of their vigilance in the manipulating of the endodontic instruments inside the canal.

Furthermore, memorizing the concentration value would allow for easy reading even after having removed the canal instrument. Resetting the information would occur when introducing the instrument in the canal again or during the automatic shutdown of the locator.

In FIG. 5b, the instrument 20 has reached the apex or, at least, is very close to it, within permissible tolerances. According to the example shown, the concentration of the irrigant is less than 1% and therefore remains below the required value. In this case, the practitioner has to renew the irrigation of the canal by adding a certain quantity of solution in order to increase the concentration of the irrigant in this zone. Moreover, the screen does not display any negative message when the concentration is not sufficient in order to prevent any confusion and make the graphical interface as intuitive as possible.

However, simplified example of the graphical interface shown hereinabove is not limiting, said interface can be modified according to the recommendations of the users to which the NaCl calculator is addressed.

Finally, it is clear from the present description that certain elements of the NaCl calculator can be modified, suppressed or replaced without however leaving the scope of the invention, defined in the claims.

What is claimed is:

1. A method for electronically indicating a concentration of an irrigation solution in a root canal of a tooth, the method comprising:

electrically connecting a device to an endodontic instrument engaged in the canal and to a lip electrode;

displaying, on a screen of the device, a progression of the instrument within said canal up to a critical apical reference point, such as a cemento-dentinal junction;

measuring, by means of two or more measurement points, in proximity to the reference area, by conductimetry, a concentration of an injected electrolyte irrigation solution within the root canal;

calculating, based on the measurement points, a concentration level of the solution injected into the canal in the previously defined area;

indicating, on the screen of the device, the measured concentration of the electrolytic irrigation solution injected into the root canal; and storing the measured concentration in the device even when the endodontic instrument is withdrawn from the root canal.

2. The method according to claim 1, wherein the measurement of the concentration of the irrigation solution further comprises taking the measurement in a zone about one millimeter before the cemento-dentinal junction in a direction of insertion of the endodontic instrument into the root canal.

3. The method according to claim 1, wherein the indication of the measured concentration comprises displaying, on the screen via a visual indicator, a measured concentration level within a medical concentration range.

4. The method according to claim 3, wherein the visual indicator is a bar graph or an alphanumeric display.

5. The method according to claim 1, wherein the electrical connection comprises using connection cords of the device to electrically connect the device to the endodontic instrument and to the lip electrode.

6. The method according to claim 1, further comprising performing calculations at two or more additional frequencies to enable, in a region near an apex, a conductimetric determination for at least a sodium hypochlorite (NaOCl) irrigation solution, and displaying a measured concentration level on a scale that includes at least one value among 0.5%, 2.5%, or 5.25%.

7. The method according to claim 1, wherein the indication comprises using the screen to display validation information as long as the measured concentration of the irrigation solution is substantially equal to an injection concentration of said solution.

8. The method of claim 1, wherein the screen displays information of the calculated concentration in the defined area.

* * * * *